June 21, 1927.
W. OVERDICK
STEERING GEAR
Filed April 21, 1924
1,633,415
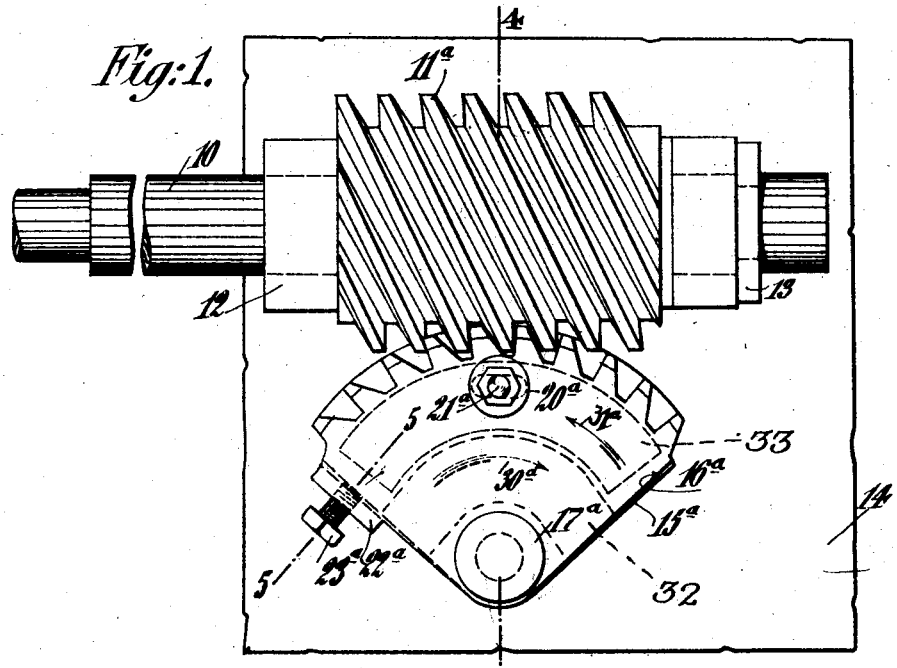
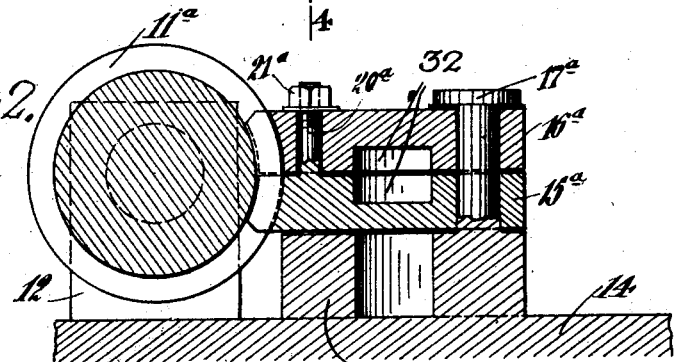
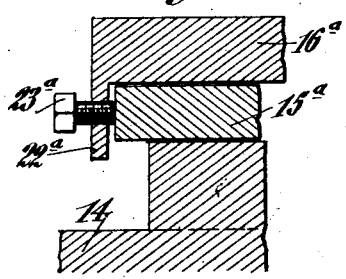
INVENTOR
William Overdick
BY C. P. Goepel Patented June 21, 1927.

1,633,415

UNITED STATES PATENT OFFICE.

WILLIAM OVERDICK, OF BROOKLYN, NEW YORK.

STEERING GEAR.

Application filed April 21, 1924. Serial No. 707,859.

This invention relates to improvements in steering gears and has for its object to provide an improved steering gear in which means are provided to take up the lost motion.

It is known that in steering devices in which the movements are transmitted by means of a worm and gear, a so-called lost motion takes place. Such lost motion is especially disadvantageous for steering devices used on automobiles and influences detrimentally the guiding security of the driver. By changing the driving direction, the driver must at all times first take up all the lost motion on the steering wheel which, in critical moments, might become very dangerous. Very often nearly half a turn of the steering wheel is required before the movement is transmitted to the wheels of the automobile. Furthermore, the driver is at all times compelled to move the steering wheel in accordance with the manner in which the wheels of the automobile are thrown by the road. The entire attention of the driver is claimed to bring about steady movement of the steering wheel and soon tires him, especially while driving big cars, such as trucks and buses.

The purpose of my invention is to avoid these disadvantages and has for its main feature an adjusting device which allows the removal of dangerous lost motions. For this purpose an additional gear is arranged to coact with the known worm of the steering device, and is positively connected with gears in such a manner that the teeth of the worm engaging gears press into the worm in contrary directions, and the worm can be at all times held by the two worm engaging gears, whereby every play which may appear between the worm and the gears is taken up. Suitable means for adjustment are also provided.

The invention will be fully understood from the following description when taken in connection with the accompanying drawings and the novel features thereof will be pointed out and clearly defined in the claim at the close of this specification.

In the drawings, wherein I have illustrated a practical embodiment of my invention and in which similar characters designate corresponding parts throughout the several views, Figure 1 is a top view of a steering device embodying my invention.

Figure 2 is a sectional view along lines 4—4 of Figure 1.

Figure 3 is a sectional view along lines 5—5 of Figure 1.

Referring now to the drawings and more particularly to Figures 1 and 2, 10 is a steering rod, as usually used in automobiles and is movably mounted on the members 12 and 13, which are connected with a suitable foundation 14.

Two worm geared segmental discs $15^a$ and $16^a$, are connected with the shaft $17^a$, which is only schematically indicated, and to the usual steering mechanism, which latter is not shown in the drawings. The two segmental disks $15^a$ and $16^a$ are essentially alike each other, both being turnable around the axis of the shaft $17^a$ and both being provided with a toothed gearing which meshes with the worm thread $11^a$ of the steering or driving rod 10. The two disks are loosely placed the one ($16^a$) on the other ($15^a$) and on their two planes facing each other they are provided with arc shaped grooves 32, which result into a certain resiliency between their central hub-forming part and their toothed circumferences. Below the toothed circumference of the lower segmental disk there is provided still an arc-shaped rut or abutment 33 adapted to take up the downwardly directed pressure of the worm on the two segmental disks.

The gear $16^a$ is provided with a slit $20^a$, through which is fitted a screw $21^a$ to hold the gear $16^a$ in its position in respect to the gear $15^a$. Gear $16^a$ is further provided with a suitably formed lap-over $22^a$, in which is fitted the set screw $23^a$, which acts upon the gear $15^a$. The set screw $23^a$ is movable, and in case any play or lost motion is present between the worm and gear $15^a$, then the gear $15^a$ is pushed in the direction of the dotted arrow $30^a$ (Figure 3) and pressed on the worm $11^a$, while gear $16^a$ moves in a direction contrary to that of gear $15^a$, shown in the drawing by arrow $31^a$, and also presses on worm $11^a$ in a different direction to the gear $15^a$, so that the worm will be tightly pressed by the two gears $15^a$ and $16^a$ in opposite directions. Thereby the lost motion is taken up and the steering rod responds instantaneously to the movement of the steering wheel.

I claim:

Steering gear with eliminated dead movement comprising in combination a driving rod with a worm thread on it; a movement transmitting driven shaft; two essentially alike segmental disks on the driven shaft with circumferential gearings meshing with the said worm thread; a longitudinal slot in the toothed circumference of the one segmental disk and a screwed fastening pin extending from the other segmental disk through the said slot, with a fastening nut at the end of this pin; a lap-over at the one side of the one segmental disk near to its toothed circumference, and a set screw in this lap-over, adapted to bear on the other segmental disk; an arc shaped groove made in the one of the segmental disks in the medium zone between its turning center and the toothed circumference; an arc shaped rut or abutment below the toothed circumference of the lower segmental disk.

In testimony that I claim the foregoing as my invention, I have signed my name hereto.

WILLIAM OVERDICK.